United States Patent
Porter

(10) Patent No.: US 11,216,528 B1
(45) Date of Patent: Jan. 4, 2022

(54) UNIVERSAL STANDARDIZED DATA COLLECTION SYSTEM AND METHOD OF USE

(71) Applicant: Morgan Porter, Argyle, TX (US)

(72) Inventor: Morgan Porter, Argyle, TX (US)

( * ) Notice: Subject to any disclaimer, the term of this patent is extended or adjusted under 35 U.S.C. 154(b) by 0 days.

(21) Appl. No.: 16/797,616

(22) Filed: Feb. 21, 2020

Related U.S. Application Data

(60) Provisional application No. 62/948,569, filed on Dec. 16, 2019.

(51) Int. Cl.
*G06F 16/957* (2019.01)
*G06F 16/958* (2019.01)
*G06F 11/34* (2006.01)

(52) U.S. Cl.
CPC ...... *G06F 16/9577* (2019.01); *G06F 11/3438* (2013.01); *G06F 16/958* (2019.01)

(58) Field of Classification Search
CPC ................................ G06F 3/14; G06F 16/9577
USPC ........................................................ 715/762
See application file for complete search history.

(56) References Cited

U.S. PATENT DOCUMENTS

| | | | |
|---|---|---|---|
| 2011/0178831 A1* | 7/2011 | Ravichandran .... | G06Q 30/0251 705/7.11 |
| 2019/0095992 A1* | 3/2019 | Soh ........................ | G07F 19/20 |
| 2019/0377902 A1* | 12/2019 | Schroeder .............. | G06N 20/20 |
| 2021/0042796 A1* | 2/2021 | Khoury .............. | G06Q 30/0272 |

* cited by examiner

*Primary Examiner* — Ruay Ho
(74) *Attorney, Agent, or Firm* — Leavitt Eldredge Law Firm

(57) ABSTRACT

A data collection system includes a computer receiving commands from a user and connected to a website; a content management tool to operate on a global data layer associated with the website, the content management tool having a platform operating on a processor, the processor further operating an artificial intelligence engine; and a database in communication with the platform and processor; the processor to perform the steps of receive one or more actions associated with the user interaction with the website; store the one or more actions within the database; analyze the one or more actions via the artificial intelligence engine; and create a predictive model based on the one or more actions; the predictive model providing data for improvement of the website.

2 Claims, 4 Drawing Sheets

UNIVERSAL STANDARDIZED DATA COLLECTION SYSTEM AND METHOD OF USE

BACKGROUND

1. Field of the Invention

The present invention relates generally to data systems, and more specifically to a universal standardized data collection system for evaluating the customer experience and use of a digital space for the selection and purchase/rental of a unit or units of a multi-family complex.

2. Description of Related Art

The multifamily (apartment) industry accounts for a large portion of housing. As shown with flowchart 101 in FIG. 1, the conventional process for renting a unit consists of a user accessing a complex website wherein the user can search for listings, as shown with box 103. The user may also interact with various third-party websites and search engines, as shown with boxes 105, 107. During the searching and leasing process, limited data is collected on the user, as shown with box 109. Apartment complex companies will spend a large budget on marketing, yet typically do not have a global viewport for micro-performance benchmarking for investment partners and management companies.

Currently, there is no adequate system for investment groups, including shareholders and interested parties, to view their investment performance associated with apartment complexes from a global setting, or for investment groups to view predictive modeling at a city, regional market, or demographic view without manually analyzing segmenting and importing into a custom dashboard.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
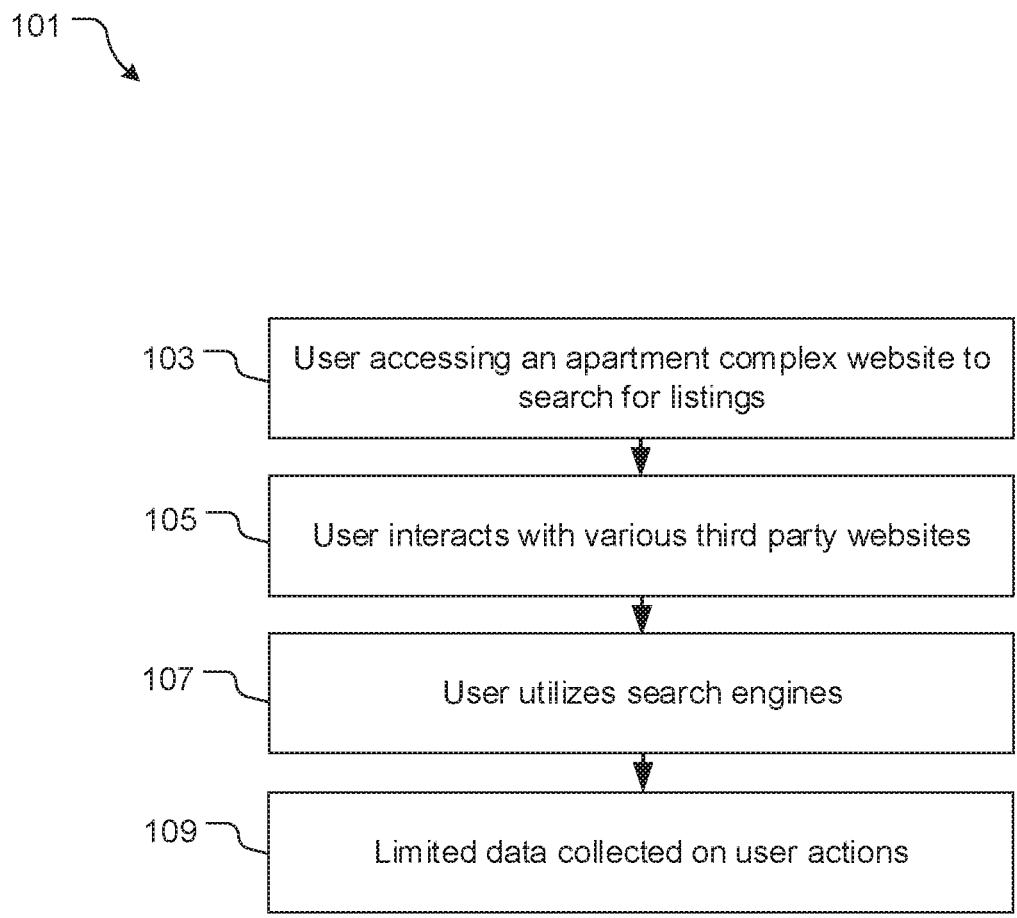
FIG. 1 is a flowchart of a conventional user interaction with an apartment complex website.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional apartment/unit searching and selection systems. Specifically, the present invention provides for improved data collection associated with user actions within a website for searching and leasing a unit within a complex. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
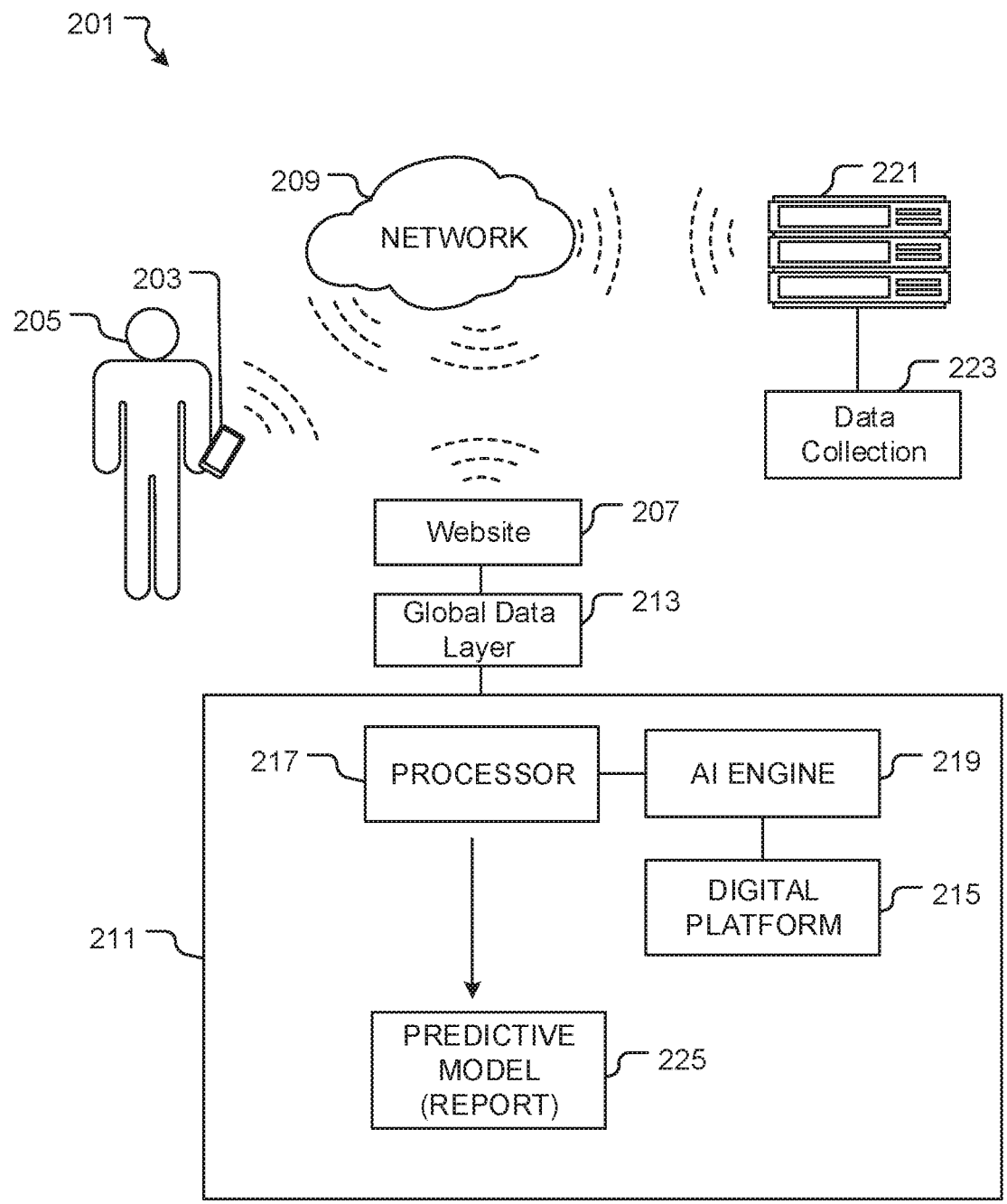
FIG. 2 is a schematic of a data collection system in accordance with a preferred embodiment of the present application.

In FIG. 2, a schematic depicts the features associated with a data collection system 201 in accordance with a preferred embodiment of the present application. System 201 includes a computer 203 receiving commands and interactions from a user 205 and connected to a website 207 such as through a global network 209. System 201 further including a content management tool 211 configured to operate on a global data layer 213 associated with the website. The content management tool 211 having a platform 215 operating on a processor 217, the processor further operating an artificial intelligence engine 219 and being in communication with a database 221.

In the preferred embodiment, the content management tool 211 is configured to receive one or more actions associated with the user interaction with the website; store the one or more actions as data 223 within the database; analyze the one or more actions via the artificial intelligence engine; and create a predictive model 225 based on the one or more actions.

It should be appreciated that one of the unique features believed characteristic of the present application is the predictive model 225 which provides data for improvement of the website. The predictive model 225 may be in the form of a report, charts, graphs, or the like that provide an investor with the knowledge necessary to make informed decisions.

Figure 3:
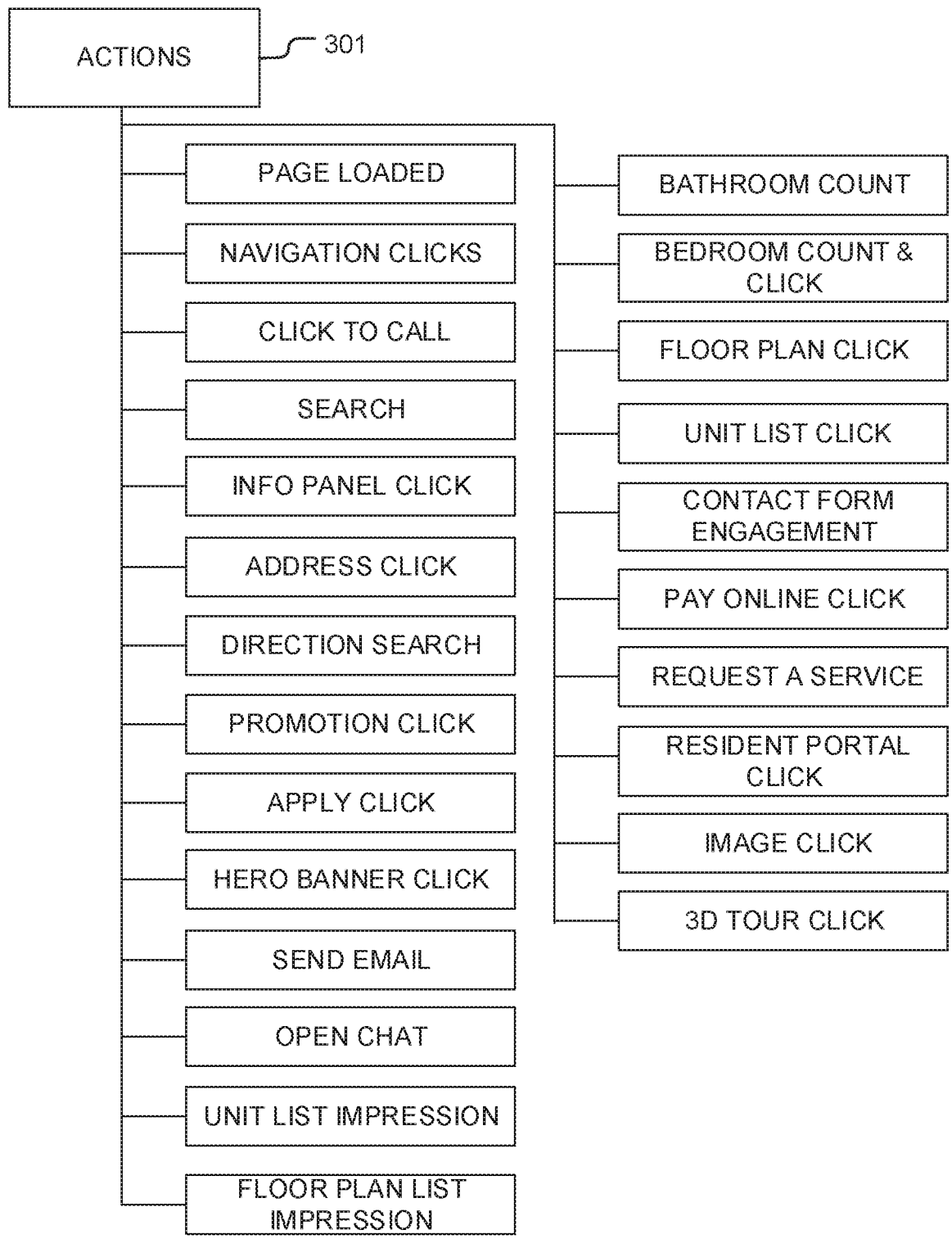
FIG. 3 is a schematic of a plurality of actions tracked in the system of FIG. 2.

In FIG. 3, a chart depicts some of the user actions 301 that the system 201 is configured to track. The user actions including one or more of: a page loaded, navigation clicks, click to call, search, info panel click, address click, direction search, promotion click, apply click, hero banner click, send email, open chat, unit list impression, floor plan list impression, bathroom count, bedroom count and click, floor plan click, unit list click, contact form engagement, pay online click, request a service, resident portal click, image click, 3D tour click and the like.

It should again be appreciated and understood that all of the data collected on the user interactions provides for necessary analytics to determine the optimal market conditions for investment opportunity.

Figure 4:
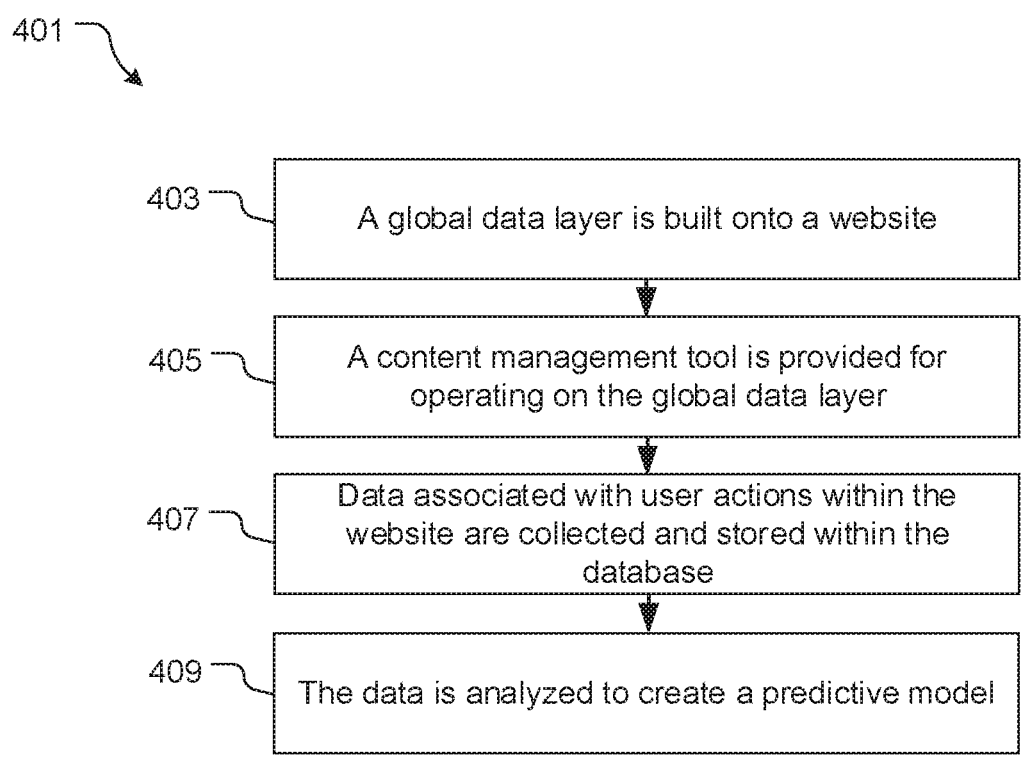
FIG. 4 is a flowchart of the method of use of the system of FIG. 2.

In FIG. 4, a flowchart 401 further depicts the method associated with system 201. First, the global data layer is built onto a website such that the content management tool can operate thereon, as shown with boxes 403, 405. Data associated with user actions within the website is then collected, as shown with box 407. The data is then analyzed to provide a predictive model for investors, as shown with box 409.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A data collection system, comprising:
 a computer configured to receive commands from a user and that is connected to a website; and
 a content management tool configured to operate on a global data layer associated with the website, the content management tool having:
   a platform operating on a processor, the processor further operating an artificial intelligence engine; and
   a database in communication with the platform and processor;
 the processor configured to perform the steps of:
   receive one or more actions associated with the user interaction with the website, the one or more action includes:
     a page load;
     a navigation click;
     a click to call;
     a search;
     an info panel click;
     an address click;
     a direction search action;
     a promotion click;
     an apply click;
     a banner click;
     a send email action;
     an open chat action;
     a unit list impression action;
     a floor plan list impression action;
     a bathroom count input action;
     a bedroom count input action;
     a floor plan click;
     a unit list click;
     a contact form engagement action;
     a pay online click;
     a request service click;
     a resident portal click;
     an image click; and
     a 3D tour click;
   store the one or more actions within the database;
   analyze the one or more actions via the artificial intelligence engine; and
   create a predictive model report for one or more apartment complexes based on the one or more actions;
   the predictive model report provides data for improvement of the website, the website being associated with the one or more apartment complexes;
   wherein the predictive model report is utilized to determine the optimal market conditions for investment opportunities in the one or more apartment complexes.

2. A method of data collection for predictive modeling, the method comprising:
 providing the system of claim 1;
 building a global data layer onto a website;
 providing a content management tool that is configured to operate on the global data layer;
 collecting data from a user interacting with the website via a computer, the data consisting of one or more actions taken by the user within the website;
 saving the data within a database;
 analyzing the data via a processor and an artificial intelligence engine; and
 creating a predictive model for one or more apartment complexes based on the analyzing of the data;
 wherein the predictive model provides information for improvement of the website of the one or more apartment complexes.

* * * * *